(12) United States Patent
Bertoncini et al.

(10) Patent No.: US 8,810,404 B2
(45) Date of Patent: Aug. 19, 2014

(54) SYSTEM AND METHOD FOR RADIO-FREQUENCY FINGERPRINTING AS A SECURITY LAYER IN RFID DEVICES

(75) Inventors: Crystal A. Bertoncini, Alexandria, VA (US); Kevin E. Rudd, Springfield, VA (US); Bryan D. Nousain, Greenbelt, MD (US); Mark K. Hinders, Williamsburg, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 171 days.

(21) Appl. No.: 13/078,125

(22) Filed: Apr. 1, 2011

(65) Prior Publication Data

US 2011/0248827 A1    Oct. 13, 2011

Related U.S. Application Data

(60) Provisional application No. 61/322,035, filed on Apr. 8, 2010.

(51) Int. Cl.
| | | |
|---|---|---|
| *G08B 23/00* | (2006.01) | |
| *H04Q 5/22* | (2006.01) | |
| *G06K 9/46* | (2006.01) | |
| *H04N 7/12* | (2006.01) | |
| *H04W 12/06* | (2009.01) | |
| *G06K 19/073* | (2006.01) | |
| *H04L 9/32* | (2006.01) | |

(52) U.S. Cl.
CPC .............. *H04L 9/3226* (2013.01); *H04W 12/06* (2013.01); *G06K 19/07354* (2013.01); *H04L 2209/805* (2013.01)
USPC ....... 340/572.4; 340/10.1; 382/207; 382/240; 375/240.19

(58) Field of Classification Search
USPC ...................... 340/572.1, 10.1; 382/207, 240; 375/240.19
See application file for complete search history.

(56) References Cited

U.S. PATENT DOCUMENTS

| | | | |
|---|---|---|---|
| 5,420,910 A | 5/1995 | Rudokas et al. | |
| 6,229,445 B1 | 5/2001 | Wack | |
| 7,835,319 B2 | 11/2010 | Sugar | |
| 2003/0086341 A1* | 5/2003 | Wells et al. ................ | 369/13.56 |
| 2003/0234718 A1 | 12/2003 | Fujisawa et al. | |
| 2005/0143928 A1* | 6/2005 | Moser et al. ................... | 702/19 |

(Continued)

OTHER PUBLICATIONS

Bertoncini, C.A.; Hinders, M.K., "Fuzzy classification of roof fall predictors in microseismic monitoring", Measurement, vol. 43, Issue 10, pp. 1690-1701, Dec. 2010.

(Continued)

*Primary Examiner* — George Bugg
*Assistant Examiner* — Munear Akki
(74) *Attorney, Agent, or Firm* — US Naval Research Laboratory; Sally A. Ferrett

(57) ABSTRACT

A system and method for authenticating a radio-frequency identification tags based on the features of the modulation features of the RFID signal. Dynamic wavelet fingerprint features are extracted from the signal by applying a wavelet transform to the signal to determine wavelet coefficients at a plurality of times and frequency scale values, creating a binary image from the wavelet coefficients, and measuring image features of at least one fingerprint object in the binary image. The measured features of the binary image fingerprint objects are compared to a database of features for the signal's EPC to authenticate the RFID tag.

16 Claims, 6 Drawing Sheets

(56) References Cited

U.S. PATENT DOCUMENTS

| | | | | |
|---|---|---|---|---|
| 2006/0181394 | A1* | 8/2006 | Clarke | 340/10.4 |
| 2008/0079540 | A1 | 4/2008 | Aull et al. | |
| 2008/0263012 | A1* | 10/2008 | Jones | 707/3 |
| 2009/0201133 | A1 | 8/2009 | Bruns | |
| 2010/0308974 | A1* | 12/2010 | Rowland et al. | 340/10.4 |
| 2012/0119881 | A1* | 5/2012 | Nguyen | 340/10.1 |
| 2012/0286934 | A1* | 11/2012 | Rowland et al. | 340/10.1 |

OTHER PUBLICATIONS

Bertoncini, C.A.; Hinders, M.K.; Ghorayeb, S.R., "Ultrasonic Detection of Tooth Flaws", Review of Progress in Quantitative Nondestructive Evaluation, vol. 29, AIP Conference Proc. 1211, pp. 1559-1565 (2010), Jul. 26-31, 2009.

Bertoncini, C.A.; Hinders, M.K., "An Ultrasonographic Periodontal Probe" Review of Progress in Quantitative Nondestructive Evaluation, vol. 29, AIP Conference. Proc. 1211, pp. 1566-1573 (2010), Jul. 26-31, 2009.

Bingham, J.; Hinders, M., "Lamb wave characterization of corrosion-thinning in aircraft stringers: Experiment and three-dimensional simulation," The Journal of the Acoustical Society of America, vol. 126, pp. 103-113, (Jul. 2009).

Bingham, J.; Hinders, M.; Friedman, A., "Lamb wave detection of limpet mines on ship hulls", Ultrasonics, vol. 49, Issue 8, pp. 706-722, (Dec. 2009).

Bono S.; Green, M., "Security analysis of a cryptographically-enabled rfid device", 14th USENIX Security Symposium, pp. 1-16, 2005.

Danev, B.; Heydt-Benjamin, T.S.; Capkum, S.,"Physical-layer identification of RFID devices", Proceedings of the 18th conference on USENIX security symposium (SSYM'09), USENIX Association, Aug. 12, 2009, pp. 199-214.

Ellis, K.J.; Serinken, N., "Characteristics of radio transmitter fingerprints", Radio Science, vol. 36, No. 4, pp. 585-597, Jul.-Aug. 2001.

Haralick, R.M.; Shapiro, L.G., Computer and Robot Vision, Addison Wesley, pp. 654-658, (1993).

Hou, J.; Rose, S.T.; Hinders, M.K.,"Ultrasonic periodontal probing based on the dynamic wavelet fingerprint," EURASIP Journal Applied Signal Processing, 2005, pp. 1137-1146, (Jan. 2005).

Juels, A., "RFID security and privacy: A research survey", EE J. Selected Areas in Communication, vol. 24, No. 2, pp. 381-395, Feb. 2006.

Langley, L.E., "Specific emitter identification (SEI) and classical parameter fusion technology," WESCON '93. Conference Record, pp. 377-381, Sep. 28-30, 1993.

McCombs, G.B.; Hinders, M., "The potential of the ultrasonic probe", Dimensions of Dental Hygiene, Apr. 2006, vol. 4, Issue 4, pp. 16-18.

Periaswamy, S.C.G.; Thompson, D. R.; Di, J., "Fingerprinting RFID Tags", IEEE Transactions on Dependable and Secure Computing, vol. 8, No. 6, pp. 938-943, Nov./Dec. 2011, IEEE date of publication Oct. 28, 2010.

Romero, H.P.; Remley, K.A.; Williams, D.F.; Wang, C.-M.; Brown, T.X., "Identifying RF Identification Cards From Measurements of Resonance and Carrier Harmonics," IEEE Transactions on Microwave Theory and Techniques, vol. 58, No. 7, pp. 1758-1765, Jul. 2010.

Rudd, K.E.; Bertoncini, C. A.; Hinders M. K., "Simulations of ultrasonographic periodontal probe using the finite integration technique," Open Acoustics Journal, vol. 1, pp. 72-90 (2008).

Saparkhojayev, N.; Thompson, D.R.; "Matching electronic fingerprints of RFID tags using the Hotelling's algorithm," IEEE Sensors Applications Symposium, 2009, pp. 19-24, Feb. 17-19, 2009.

Skybitz, Incorporated, "GLS Technology Provides Increased Security and Efficienty for Satellite Tracking of Shipments with Low Power Devices", DARPA SBIR Report vol. 2, pp. 29-30, [online], retrieved on Jan. 2, 2013, retrieved using internet <www.darpa.mil/WorkArea/DownloadAsset.aspx?id=1050>.

Ureten, O.; Serinken, N., "Wireless security through RF fingerprinting," Canadian Journal of Electrical and Computer Engineering, vol. 32, No. 1, pp. 2733, (2007).

Want, R., "An introduction to RFID technology", IEEE Pervasive Computing, pp. 25-33, Jan.-Mar. 2006.

Zanetti, D.; Danev, B.; and Capkun, S., "Physical-layer identification of UHF RFID Tags", Proceedings of the Sixteenth Annual International Conference on Mobile Computing and Networking, MobiCom '10, Sep. 20-24, 2010, pp. 353-364, (Sep. 2010).

* cited by examiner

SYSTEM AND METHOD FOR RADIO-FREQUENCY FINGERPRINTING AS A SECURITY LAYER IN RFID DEVICES

CROSS-REFERENCE TO RELATED APPLICATIONS

This application claims the benefit of U.S. Provisional Application 61/322,035 filed on Apr. 8, 2010, the entire disclosure of which is incorporated herein by reference.

BACKGROUND

1. Technical Field

This application is related to systems for authenticating signals, and more particularly to systems for authenticating a radio-frequency identification tag.

2. Description of Related Technology

With the ubiquity of RFID tags in modern life, concerns about the security of RFID have arisen. Cloning of RFID tags in devices such as car keys or ID badges can lead to security breaches, as discussed in A. Juels, "Rfid security and privacy: A research survey", EE J. Selected Areas in Communication, Vol. 24, No. 2), pp. 381-395, February 2006. For example, as described in S. Bono and M. Green, "Security analysis of a cryptographically-enabled rfid device", 14th USENIX Security Symposium, pages 1-16, 2005, researchers at Johns Hopkins University and RSA Laboratories were able to apply reverse engineering to simulate an ignition key for their own car and to clone a Speedpass® RFID token for purchasing gasoline.

Some proposed fixes to RFID security involve stronger encryption of the RFID code, or restricting physical access to reading the RFID device. However, stronger encryption can be too expensive to apply to inexpensive RFID tags. Devices such as ID badges are not easily restricted from being read by RFID readers.

In the electronic warfare arena, specific emitter identification techniques have been developed at the Naval Research Laboratory to catalog radar transmitters, and to later intercept a radar signal and uniquely identify the radar transmitter that is the source of that signal.

In Radio Science, Vol. 36, No. 4, pp. 585-597, July-August 2001, K. J. Ellis and N. Serinken discuss extracting features from the transient start up phase of a VHF radio transmission, and using those characteristics to unambiguously identify an individual transmitter.

S. C. G. Periaswamy, D. R. Thompson, J. Di, "Fingerprinting RFID Tags", IEEE Transactions on Dependable and Secure Computing, 21 Oct. 2010, IEEE computer Society Digital Library, <http://doi.ieeecomputersociety.org/10.1109/TDSC.2010.56>, discusses using a tag's minimum power responses at multiple frequencies as a uniquely identifying fingerprint of the tag.

N. Saparkhojayev and D. R. Thompson, in "Matching Electronic Fingerprints of RFID Tags using the Hotelling's Algorithm", IEEE Sensors Applications Symposium, New Orleans, La., Feb. 17-19, 2009, propose creating an electronic fingerprint of a tag, with different features such as amplitude, frequency, phase, and timing, and using the Hotelling's T2 algorithm to compare a tag's fingerprint with a database of tag fingerprints.

D. Zanetti, B. Danev, and S. Capkun, in "Physical-layer identification of UHF RFID Tags", Proceedings of the Sixteenth Annual International Conference on Mobile Computing and Networking, MobiCom '10 on Sep. 20-24, 2010 in Chicago, Ill., ACM, pp. 353-364, evaluate using measured time domain features and spectral domain features of passive UHF RFID tag preambles for classifying and identifying RFID tags.

U.S. Patent Publication No. 2006/0181394 to Clarke describes a method for comparing an RFID tag fingerprint to an expected RF fingerprint, with the fingerprint including measurements of signal amplitude, phase, and frequency. Other U.S. patents and patent applications in this area include U.S. Patent Application Publication No. 20030234718 to Fujisawa, U.S. Pat. No. 5,420,910 to Rudokas, U.S. Pat. No. 6,229,445 to Wack, U.S. Patent Application Publication No. 20080079540 to Aull et al., U.S. Pat. No. 5,420,910 to Rudokas et al., and U.S. Patent Application Publication No. 20090201133 to Bruns.

SUMMARY

A method for determining authenticity of a radio frequency identification tag encoded with an EPC includes receiving a signal from the radio frequency identification tag; extracting features from the signal; and comparing the measured image features to a database of features for the signal's EPC to classify the RFID tag as being authentic or not authentic. Features are extracted by applying a wavelet transform to the signal to determine wavelet coefficients at a plurality of times and frequency scale values, creating a binary image from the wavelet coefficients, and measuring image features of at least one fingerprint object in the binary image.

A method for measuring and storing dynamic wavelet fingerprint features of an RFID tag for authenticating the RFID tag includes receiving a signal from a radio frequency identification tag encoded with an identifying code; extracting features from the signal by applying a wavelet transform to the signal to determine wavelet coefficients at a plurality of times and frequency scale values, creating a binary image from the wavelet coefficients, with the binary image having at least one fingerprint object, and measuring a plurality of image features of at least one fingerprint object; and storing the RFID EPC and the measured plurality of image features in an authentication database RFID tags for use in authenticating the RFID tag.

The dynamic wavelet fingerprint features can be one or more of measured image features include at least one of area, perimeter, coordinates of pixels, centroid, eccentricity of an ellipse corresponding to the second moment of the fingerprint object in the binary image, diameter of a circle with the same area as the fingerprint object, a Euler number of the fingerprint object, the extent of the fingerprint object, the filled area of the fingerprint object, solidarity, central area, normalized second central moment, inclination of a major axis of the ellipse relative to a horizontal axis, and a polynomial coefficients of a $2^{nd}$ or $4^{th}$ order polynomial fit to a boundary of the fingerprint object. A subset of features can be selected for each RFID tag that will be used to classify the RFID tag as authentic or not authentic. Additional features can include higher order statistical features from each RFID tag signal.

A radio frequency identification tag reader for authenticating a radio frequency identification tag, with a processor programmed with instructions for receiving a signal from the radio frequency identification tag; extracting features from the signal by applying a wavelet transform to the signal to determine wavelet coefficients at a plurality of times and frequency scale values, creating a binary image from the wavelet coefficients, and measuring image features of at least one fingerprint object in the binary image; and comparing the measured image features to an authentication database of features specific to the RFID EPC to classify the RFID tag as being authentic or not authentic.

DETAILED DESCRIPTION OF EMBODIMENTS OF THE INVENTION

Radio frequency identification (RFID) tags are small RF devices used to identify objects and people. Each tag includes an electronic circuit that transmits a unique code carrying that identifies the tagged object or person. The unique code can be an Electronic Product Code (EPC) with a structure defined in the EPCglobal Tag Data Standard, or another code.

A group of RFID tags can be "fingerprinted" when they are created or issued. This fingerprint is based on the unintentional modulation characteristics of the RFID tag itself, rather than the data that is transmitted by the tag. The unique modulation characteristics result from variations in the manufacturing process and the RFID tag components.

Figure 1:
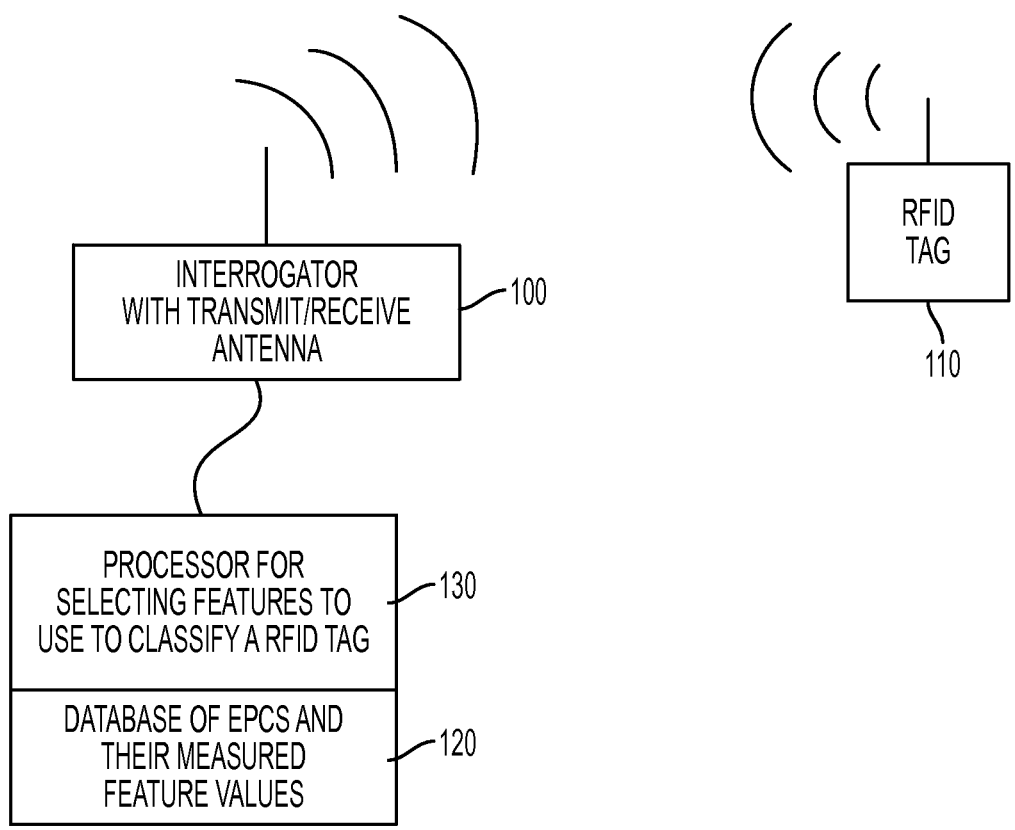
FIG. 1 illustrates an RFID interrogation system and RFID tag configured to select features for authenticating each RFID tag.

As shown in FIG. 1, in a passive RFID tag system, an interrogation device 100 transmits an interrogation signal to the RFID tagged device. The RFID tag 110 returns a signal to the interrogation device, and the interrogation device can determine the identity of the RFID tag device based on the data encoded on the returned signal. The interrogation device can determine whether the RFID signal is genuine by comparing features of the returned signal with previously measured features of the RFID tag signal. A spoofed tag will not have the same RF fingerprint as the original, and will be rejected by the reader.

The signal s is a complex-valued envelope composed of real and imaginary parts r and c. The amplitude a, phase θ, and instantaneous frequency $f_i$ can be found according to the equations:

$$s(t) = r(t) + ic(t)$$
$$a(t) = \sqrt{r^2(t) + c^2(t)}$$
$$\theta(t) = \tan^{-1}\left(\frac{r(t)}{c(t)}\right)$$
$$f_i(t) = \frac{1}{2\pi}\frac{d}{dt}\theta_h(t)$$

where $\theta_h(t)$ is the phase $\theta(t)$ unwrapped whenever the phase passes through multiples of $2\pi$. The signal processing step of reducing complex-valued s to one of a, θ, or $f_i$ will be referred to as EPC compression.

As described in more detail in later paragraphs, the RF fingerprint of a tag will include several features. The features that will be used to verify the authenticity of a specific tag can be different for different individual tags, and will be determined by a feature selection process when the EPC is initially written to the RFID tag.

In an exemplary embodiment, the features will include at least several features from a wavelet image associated with the signal, extracted using a Dynamic Wavelet Fingerprinting technique. The features can also include statistical features, and optionally, features determined by a wavelet decomposition technique. The features for each RFID tag are stored in a database associated with encoded data that identifies the RFID tagged device (e.g., the EPC).

For each tag type, the EPC extraction routine results in N-many different EPC signals, $s_j(t)$, corresponding to an individual tag $\tau_j$ with j=1, ..., N. Features are extracted from the signal, and a maximum number M of the features are selected to be used to determine whether an RFID tag is genuine. An element of the feature vectors will be denoted $x_{j,k}$, with k=1, ..., M.

Figure 2:
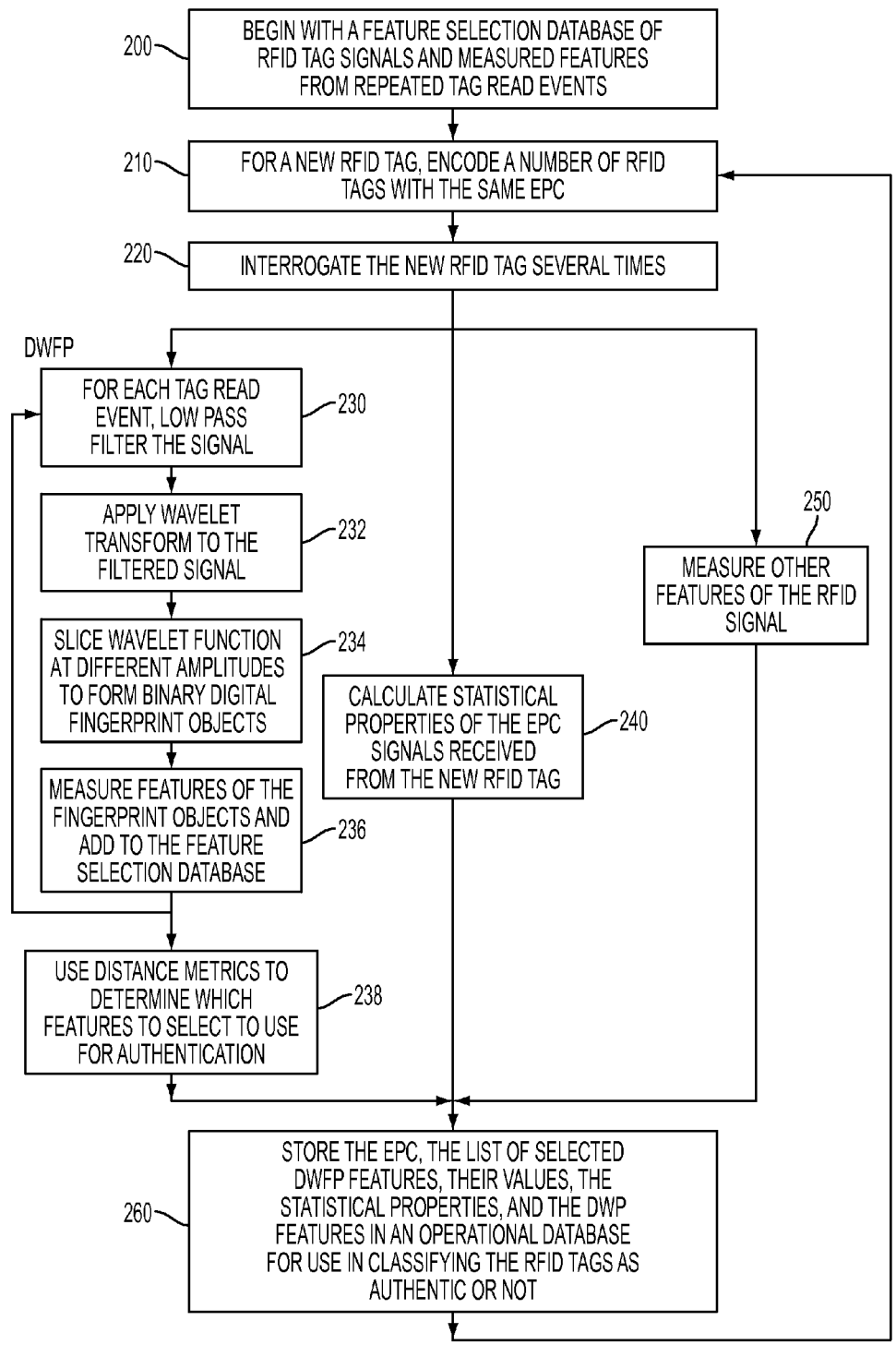
FIG. 2 illustrates a method for determining which subset of features should be used to identify a particular RFID tag encoded with a specific EPC.

FIG. 2 illustrates the steps involved in selecting a subset of features that will be used to authentic a particular RFID tagged device, and storing the features in an authentication database for operational use in authenticating the RFID tags.

Pattern classification for the RFID tags includes several components:

1) Sensing, in which the RFID tags are read, and EPC codes from several tag read events (TREs) are gathered from each individual tag.

2) Feature extraction, in which measurements are made from each EPC code.

3) Feature selection is an optional step in which the subset of possible features is reduced to make the process more computational efficient and/or to remove irrelevant features.

4) Classification, in which the data set is split with a resampling algorithm into training and testing subsets. The classifier is trained on the training set and tested with the testing set.

5) Decision, in which the predicted class of the testing set is finalized and the performance of the classifier is evaluated.

Initially, as shown at steps 200 of FIG. 2, a number of the same type of RFID tags are encoded with different identification codes (e.g., EPCs). The tags are interrogated numerous times by an RFID reader, and the return signal of each of the tag read events (TREs) is saved. This provides a large set of RFID signals to use in selecting which features will be suitable to use as the authenticating features for a tag.

In addition, some of the tags can be encoded with the same EPC, as will be described in more detail in later paragraphs. The initial fingerprinting process when the tag is issued may or may not need fingerprints from other tags to provide negative examples. Negative examples are only needed if the fingerprints depend on the value of the EPC. If the fingerprints are EPC-independent, then negative tag examples don't need to be fingerprinted at issue. For a new RFID tag encoded with an EPC, the new tag is interrogated a number of times, as shown at step 220 in FIG. 2.

The method includes a process of selecting dynamic wavelet fingerprint features, and optionally includes measuring statistical properties of the EPC signals and wavelet packet decomposition-based features of the EPC signals.

The procedure described below and shown schematically at steps 230-238 of FIG. 2 is used to extract the Dynamic Wavelet Fingerprinting (DWFP) features.

Each returned RFID signal $s_j(t)$ is first low-pass filtered 230. One suitable low-pass filter method includes applying a stationary wavelet transform and removing the first five details. However, it may be suitable to remove more or fewer than five details.

Figure 3A:
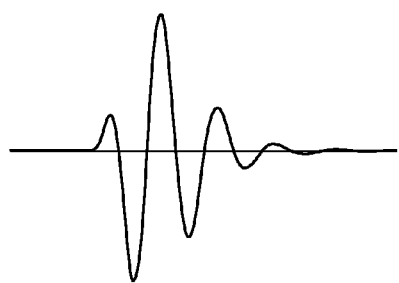
FIG. 3 illustrates graphically steps in generating fingerprint images.

Then, the dynamic wavelet fingerprinting (DWFP) technique applies a wavelet transform on the low-pass filtered time domain waveform, as shown at step 232 of FIG. 2. The wavelet transform is a mathematical operation that maps a waveform from the time domain to the time-scale domain. An example of a time domain waveform is shown in FIG. 3A.

Figure 3B:
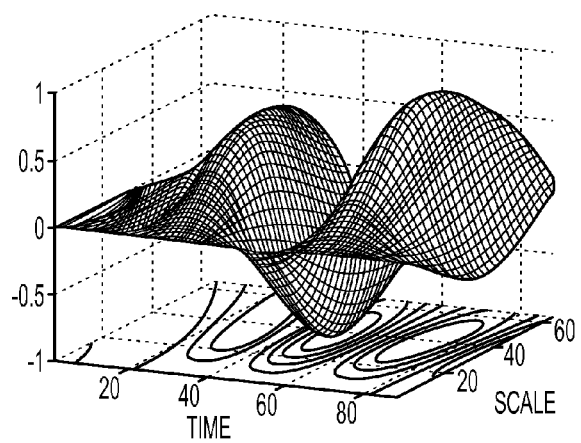

The dynamic wavelet transform results in a set of wavelet coefficients, which can be indexed by time and scale as shown in FIG. 3B. The continuous wavelet transform can be written as $$C(a,b) = \int_{-\infty}^{+\infty} s(t) \overline{\psi_{a,b}(t)} dt$$

where s(t) represents a square-integrable 1D function and $\psi_{a,b}(t)$ represents the mother wavelet scaled in frequency and translated in time according to $$\psi_{a,b}(t) = \frac{1}{\sqrt{a}} \psi\left(\frac{t-b}{a}\right),$$

and the bar above the mother wavelet symbol denotes the complex conjugate.

Wavelets are generated from the mother wavelet for a particular frequency and time (t) with a, b being real numbers, the scale a being proportional to frequency and translation b being proportional to t.

Some suitable mother wavelets are the Debauchies 3 wavelet, the Symelet 5 wavelet, the Meyer wavelet, the Haar wavelet, the coiflet 3 wavelet, although other mother wavelets can also be used.

Figure 3C:
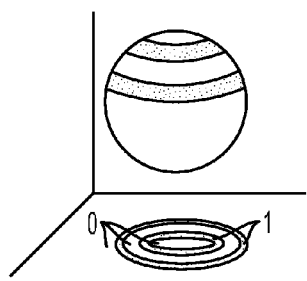
Figure 3D:
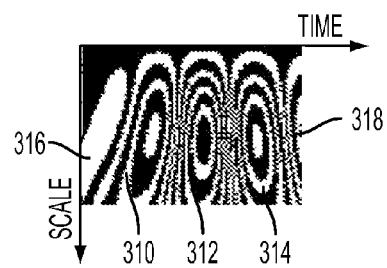

The resulting wavelet coefficients are then sliced at different times, as shown in at step 234 of FIG. 2 and graphically in FIG. 3C. The resulting slices are projected onto a time-scale plane as shown in FIG. 3D. The binary image I(a,b) is the wavelet transform of the function s(t) sliced along the time axis. These operations are shown schematically at steps 234 and 236 of FIG. 2.

As seen in FIG. 3D, the binary images of FIG. 2D have a number of loop features that resemble human fingerprints. Because the loop features resemble human fingerprints, these loop features are also called "fingerprints" or "fingerprint objects". Thus, the image shown in FIG. 3D has five fingerprint objects 310, 312, 314, 316, and 318.

The next step is to apply image processing routines to collect properties from each fingerprint object in each binary image, as shown at step 236 of FIG. 2. The binary image I can be labeled with 8-connected objects, allowing each individual fingerprint in the image I to be recognized as a separate object. One suitable procedure is described in Haralick and Shapiro, Computer and Robot Vision, incorporated by reference in its entirety.

Next, properties are measured for each of the fingerprint objects in the image. Many properties or features can be measured. Some properties involve a count of the on- and off-pixels in the region. Other properties include the area of the fingerprint object and the perimeter of the fingerprint object. Other properties involve finding an ellipse matching the second moments of the fingerprint, and measuring the properties of the ellipse, e.g., the eccentricity of the ellipse. A measurement of inclination of the ellipse relative to the horizontal axis can be determined using Horn's method for a continuous 2-D object, as described in B. K. P. Horn, Robot Vision, MIT Press, 1986. Additional properties were measured by determining the boundary of the fingerprint and fitting $2^{nd}$ or $4^{th}$ order polynomials, with the polynomial coefficients being the features.

More specifically, the following are some of the feature measurements that can be made on the fingerprints that have survived the preprocessing steps. These measurements are performed on an image matrix I(a,b), where a,b are the same scale and translation parameters used in the DWFP transform over ranges a=1, . . . , $n_a$ and b=1, . . . , $n_b$. Let l represent the pixel label for the 8-connected objects in the image I and let x, y represent the coordinates For each l, the properties measured include:

The coordinates of the pixels in I: Let $\vec{p}$ represent the list of pixel coordinates so that p(i,1) represents the $i^{th}$ b-coordinate and p(i,2) represents the $i^{th}$ a-coordinate of the pixel with label l in I:

$$\vec{p} = \{(a,b) | I(a,b) = l\}.$$

The area (or total number of pixels in with label l)

$$A = \{\#(a,b) | I(a,b) = l\}.$$

The centroid (or center of mass) ($c_b$, $c_a$):

$$c_b = \frac{1}{A} \sum_{i=1}^{A} p(i, 1)$$

$$c_a = \frac{1}{A} \sum_{i=1}^{A} p(i, 2)$$

The diameter of a circle with the same area as the region:

$$D_c = \sqrt{\frac{4A}{\pi}}.$$

Extent, which is the number of total "on" pixels divided by the total pixels surrounded by the region $$E_x = \frac{A}{[\min_i p(i, 1) - \max_i p(i, 2)] \cdot \max_i p(i, 2)}.$$

Filled area, which is the number of "on" pixels in the region where the holes have been filled in. The image with the holes filled in is called the filled image and is calculated by removing all off pixels that are not connected to the image border.

The Euler number is a topological attribute. Using the concept of neighborhoods and connectivity, the Euler number is the number of objects in an image minus the number of holes in the object. For 8-connectivity, the Euler number for a binary image is calculated by $$E = \frac{1}{4}(n\{Q_1\} - n\{Q_3\} - 2n\{Q_D\})$$

The $Q_i$ are 2×2 sections of the image called bit quads. Here, $Q_i$ is a bit quad with a single 1 and three 0's, while $Q_3$ is similarly a bit quad with three 1's and a single 0. Lastly, $Q_D$ is a bit quad with diagonal 1's's. The $n\{Q_i\}$ represents the number of bit quads of that type in the image.

The convex image is produced by finding the smallest convex polygon that can contain the "on" pixels with value l.

From this image, the convex area ($A_C$) is calculated, which is the total number of pixels in the convex image.

The solidity s, which is calculated according to $$s = \frac{A}{A_C}.$$

Some of the properties computed by MATLAB's image processing routines require measuring the second central moments of the fingerprint. The formula for central moments is given by $$\mu_{p,q} = \sum_x \sum_y (x - \bar{x})^p (y - \bar{y})^p f(x, y)$$

for a digital image f(x, y) at centroid location ($\vec{x}$, $\vec{y}$). Therefore, the normalized second central moment has three components:

$$\mu_{2,0} = \mu_{2,0}/\mu_{0,0} = M_{2,0}/M_{0,0} - \vec{x}^2$$

$$\mu_{0,2} = \mu_{0,0}/\mu_{0,0} = M_{0,2}/M_{0,0} - \vec{y}^2$$

$$\mu_{1,1} = \mu_{1,1}/\mu_{0,0} = M_{1,1}/M_{0,0} - \vec{x}\vec{y}$$

where $M_{i,j}$ is the raw moment given by $$M_{i,j} = \sum_x \sum_y x^i y^j I(x, y)$$

for pixel intensity I(x, y).

Using these equations, the three components for the normalized second central moment for I(x, y)=1 are found as $$\mu_{2,0} = \frac{1}{A} \sum_{i=1}^{A} (p(i, 1) - c_b)^2 + \frac{1}{12}$$

$$\mu_{0,2} = \frac{1}{A} \sum_{i=1}^{A} (p(i, 2) - c_a)^2 + \frac{1}{12}$$

$$\mu_{1,1} = \frac{1}{A} \sum_{i=1}^{A} (p(i, 1) - c_b)(p(i, 2) - c_a)$$

where we have used the fact that $1/12$ is the normalized second central moment of a pixel with unit length.

Many of these features can be calculated using image processing software such as the MATLAB Image Processing Toolbox™, commercially available from The Mathworks, Inc., headquartered in Natick, Mass.

Image processing routines that calculate the features identified above result in fingerprint properties $D_{j,v}[t]$, where v represents an index of the image processing extracted fingerprint properties (v=1, ..., 16). These properties are discrete in time because the values of the properties are matched to the time value of the fingerprint's center of mass.

In order to compare the properties over a continuous time scale rather than only at the discrete time points, the properties are linearly interpolated to yield a smoothed array of property or feature values $D_{j,v}(t)$.

The linearly interpolated feature values are added to the feature selection database that contains feature values for all of the measured RFID tags, as shown at step 236 of FIG. 2.

The next step is to determine which features should be used for authenticating a particular RFID encoded with a particular EPC, shown as step 238 of FIG. 2.

A goal of applying the DWFP technique to the RFID waveforms $s_j(t)$ is to find M-many features $x_{j,k}$ for k=1, ..., M, that can be used to successfully classify the tag $\tau_j$, for j=1, ..., N, where N is the total number of tags. The user or designer can select the number of features, M, that will be used to discriminate between an authentic tag (the correct tag encoded with an EPC) and a non-authentic tag, (e.g., a different tag or device that has been encoded with the same EPC). The number of features can also be set within the software program instructions without any human input.

The classifier can be designed for one versus one classification, in which one testing tag will be compared against features designed to identify one classifier tag, so the features will be selected from the property values $D_{j,v}$ that have the best chance of correctly identifying the classifier tag. Therefore, a Euclidean distance metric can be used to indicate the most highly separable interclass distance, with the $D_{j,v}$ values first being normalized to allow comparison of Euclidean distances for different fingerprint properties v. For example, the fingerprint properties v might include eccentricity of an ellipse fit to the fingerprint, a coefficient of the second order polynomial fit to the boundary of a fingerprint, etc.

In a classifier designed to identify a tag $\tau_L$, in which L is a member of the set of tags $\{1, \ldots, N\}$, the label of the $s_L(t)$ corresponding to that tag will be positive (e.g., $\omega_L=1$) while all the other tags have a negative label (e.g., $\omega_S=-1$), where $\tau_S \neq \tau_L$ and S is a member of the set $\{1, \ldots, N\}$ and the intersection of the sets S and L is not zero ($S \cap L \neq 0$). So there will be N copies of an EPC from the same physical RFID tag, and S copies of EPCs from other different physical tags.

Figure 4A:
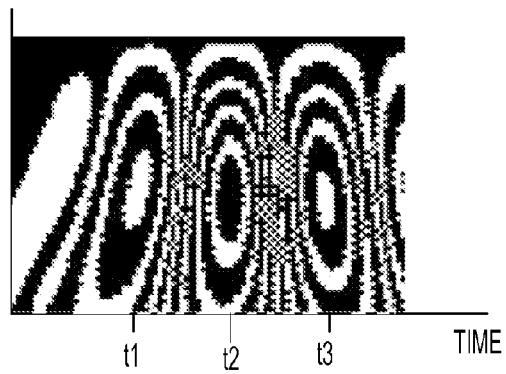
FIG. 4A-4E illustrate graphically some aspects of a method for selecting features of the dynamic wavelet fingerprint images.
Figure 4B:
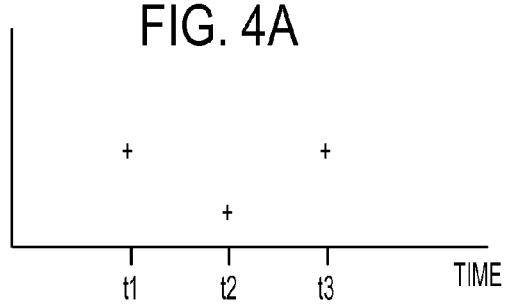
Figure 4C:
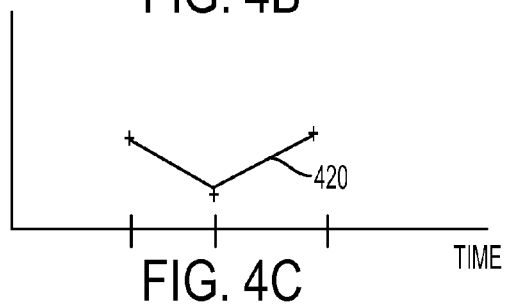

For example, for the image fingerprints in FIG. 4A, FIG. 4B plots the values of the eccentricity versus time for a single tag read events for a particular tag with a particular EPC, plus a number of negative examples (tag read events for one or more other tags with the same EPC), plus other tags with other EPCs.

$D_v$ is defined as the maximum value of the property values $D_{j,v}$, over all j for a fixed value of the number of properties v.

The mean and standard deviation of the normalized $D_{j,v}(t)$ corresponding to the subsets L, S can be calculated according to:

$$\mu_{L,v}(t) = \sum_{l \in L} D_{l,v}(t) / D_v$$

$$\sigma_{L,v}(t) = \sqrt{\frac{1}{L} \sum_{l \in L} \left( \frac{D_{l,v}(t)}{D_v} - \mu_L(t) \right)}$$

$$\mu_{S,v}(t) = \sum_{s \in S} D_{s,v}(t) / D_v$$

$$\sigma_{S,v}(t) = \sqrt{\frac{1}{S} \sum_{s \in S} \left( \frac{D_{s,v}(t)}{D_v} - \mu_S(t) \right)}$$

It is desired to select the measurement time and feature which distinguish well between the particular tag carrying a particular EPC and all the other tags. Therefore, distance metrics are used to select times $t_m$ corresponding to a large difference in the mean and a small standard deviation. The distance metric $d_v(t)$ is calculated as the difference between the interclass means according to:

$$d_v(t)|\mu_{L,v}-\mu_{S,v}|.$$

with the interclass standard deviation STD given by $$\sigma_v(t)=\max(\sigma_{L,v}(t),\sigma_{S,v}(t)).$$

Therefore, the feature selection proceeds by finding the times $t_m$ at which the interclass distance $d_v(t_m)$ is large, while the interclass standard deviation $\sigma_v(t_m)$ remains small. The largest normalized values of the distance metric can then be chosen between all the fingerprint properties. For each value of m, with m being a member of 1, . . . , M, the features selected $x_{j,k}$ correspond to the time values $t_m$ for which the distance $d_v(t_m)$ are the largest for all the possible properties v.

This process produces a list of M features, and a time for measuring each feature, that will be used to classify that particular RFID tag. The process might select more than one time for measuring a feature. For example, the selected features might include two measurements of eccentricity, at time $t_1$ and a different time $t_2$.

An example of this process is shown in FIG. 4A-4E. FIG. 4A shows example binary fingerprints derived using the dynamic wavelet fingerprint process. FIG. 4B shows a measurement of one feature of the fingerprints at discrete times t1, t2, and t3. The curve 420 in FIG. 4C results from linear interpolation of the FIG. 4B values to determine values at intermediate times.

Figure 4D:
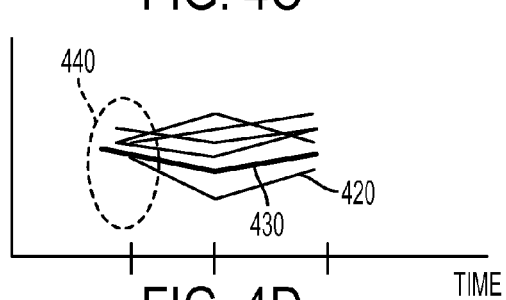

FIG. 4D shows the linearly interpolated values for several tag read events for the same RFID tag with the same EPC. The average of these values is shown as the heavy solid line 430. There will be one curve for each tag read event, although five tag read event curves are shown for convenience.

Figure 4E:
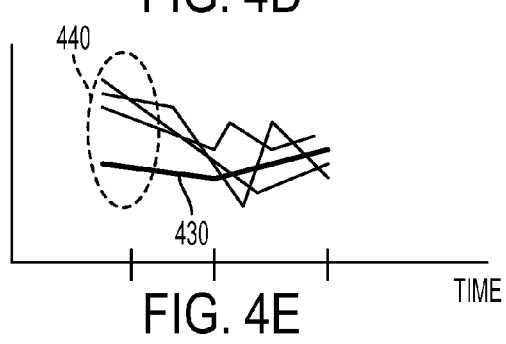

FIG. 4E compares the average feature value curve 430 for that feature with average feature value curves obtained for other features and many other RFID tags, with the values normalized for comparison. To completely illustrate this, the number of curves will be the number of measured features multiplied by the number of RFID tags. However, only four curves are shown here for clarity.

As discussed in the paragraphs above, it is desirable to select features that have a large distance metric, (e.g., select a feature that is spaced far apart from the other curves in FIG. 4E), and a small standard deviation (e.g., at a region in FIG. 4D where the curves are relatively closely spaced. This selection is made by use of the equations for $d_v(t)$ and $\sigma_v(t)$ above. Graphically, the region 440 in FIGS. 4D and 4E has both a small standard deviation and a large distance, so measuring this feature at a time near time t1 would be suitable to include in the choice of features for this RFID tag.

Higher Order Statistical Features:

Referring again to FIG. 2, in addition to extracting the features of the DWFP binary fingerprint, statistical features can be extracted from the EPCs and used for verification, as shown at step 240. Some suitable statistical features include mean of the EPC, maximum cross correlation, variance, Shannon entropy, second moment, skewness, and kurtosis, as described below in more detail.

In an exemplary embodiment, the features that will be used to determine the authenticity of an EPC will be the M features from the DWFP method above, plus all of these statistical features. Alternatively, fewer statistical features can be included, or additional statistical features can be included, depending on analysis of which features provide good results for a particular tag type.

One feature is the mean of the EPC calculated as $$\mu_j = \frac{1}{|s|}\sum_t s_j(t).$$

Another feature is the maximum correlation of $s_j(t)$ with another EPC from the same tag, $s_k(t)$, where $\tau_j=\tau_k$, calculated as $$\max\left(\sum_t s_j^*(t)s_k(t+\tau)\right).$$

The variance of $s_j(t)$ can be calculated as $$\frac{1}{|s|-1}\sum_t (s_j(t)-\mu_j)^2.$$

The Shannon entropy can be calculated as $$\sum_t s_j^2(t)\ln(s_j^2(t)).$$

Another feature is the second central moment, calculated as $$\frac{1}{|s|}\sum_t (s_j(t)-\mu_j)^2.$$

Skewness is calculated as $$\frac{1}{\sigma_j^3|s|}\sum_t (s_j(t)-\mu_j)^3.$$

Kurtosis is calculated as $$\frac{1}{\sigma_j^4|s|}\sum_t (s_j(t)-\mu_j)^4.$$

This list is not exhaustive.

Other Features

Other features can be extracted from the signal, as shown at step 250 of FIG. 2. For example, wavelet packet decomposition can be used to find additional features of the RFID signal that can be used to authenticate the RFID tag. Transient signal classification using wavelet packet decomposition techniques are described in R. E. Learned and A. S. Wilsky, "A wavelet packet approach to transient signal classification", Applied and Computational Harmonic Analysis, vol. 2, pp. 265-278, 1995. Additional discussion of wavelet packet decomposition to extract signal features is found in Bertoncini, C. A., "Applications of pattern classification to time-domain signals", Thesis (Ph.D.), College of William and Mary, 2010, incorporated herein in its entirety.

singular value decomposition returns the eigenvalues with the highest energy. The WPD elements corresponding to the singular eigenvalues of the wavelet packet transform are used as features.

Determining Authenticity of an RFID Tag

The system includes an authentication database of all the RFID tags, their EPCs, and the selected features that will be used to authenticate the RFID tags.

For each RFID tag, the authentication database 510 includes the tag's EPC, a list of the selected features specific to that tag, and the times at which each individual feature are to be measured. The database can also include the values of the other features, including the statistical features and the wavelet packet decomposition features.

Initially, the feature selection database is the same as the authentication database, until new positive and/or negative examples are read from the interrogator and can be added to the authentication database.

Figure 5:
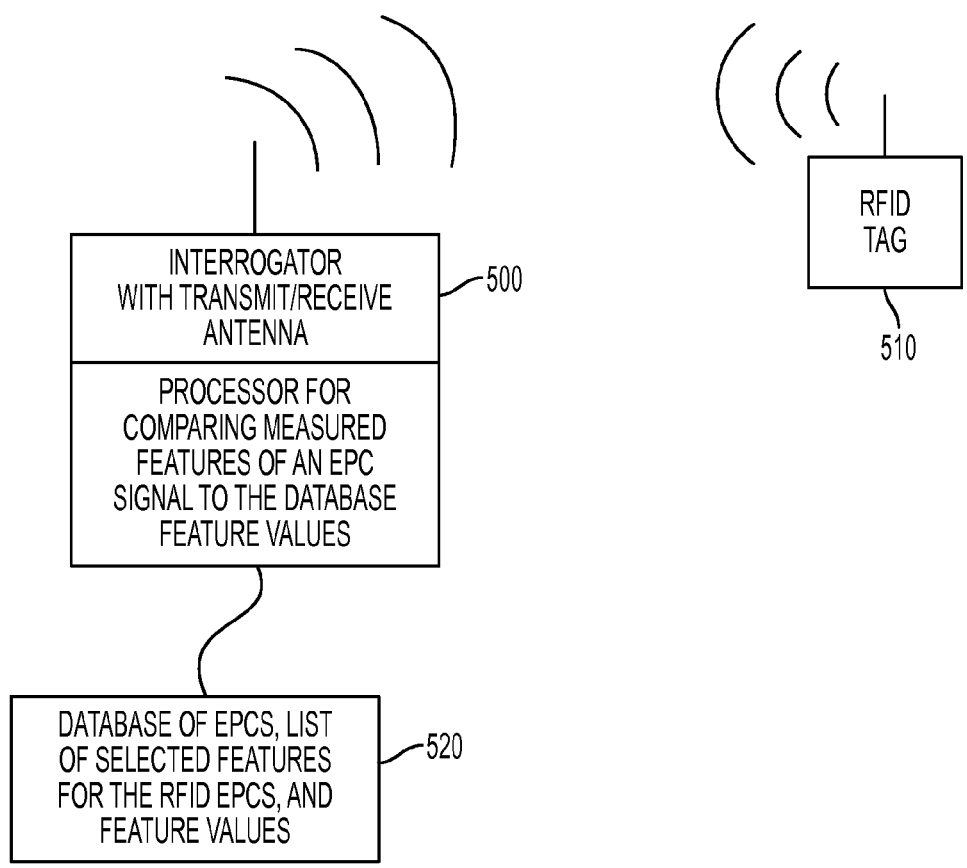
FIG. 5 illustrates an RFID interrogation system and RFID tag configured to authenticate the RFID tag.
Figure 6:
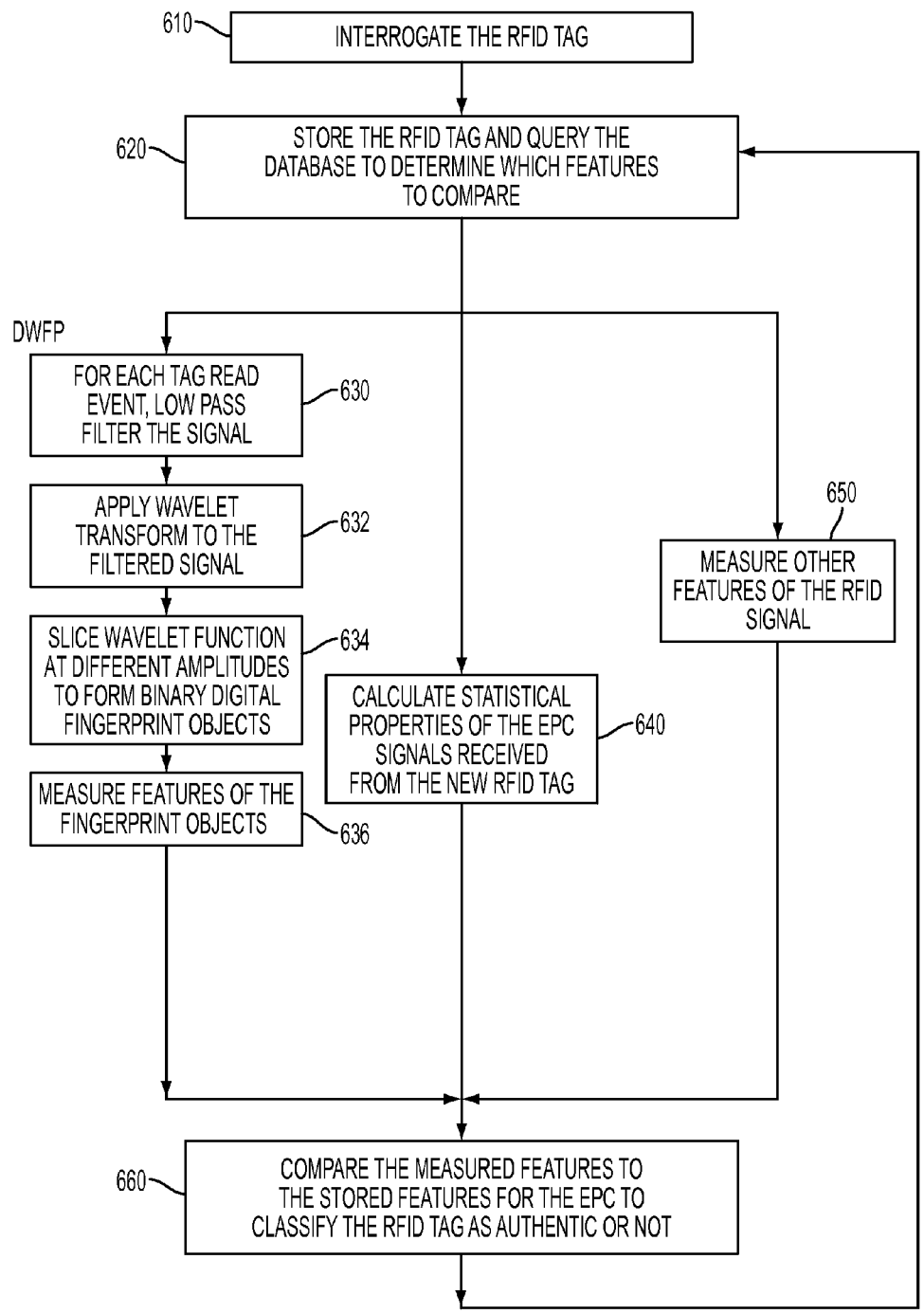
FIG. 6 illustrates a method for authenticating a particular RFID tag encoded with a specific EPC.

As seen in FIGS. 5 and 6, when the interrogation device 500 interrogates and receives a signal from an RFID tag 510, it stores the RF signal and extracts the EPC. Next, as shown in FIG. 6 at steps 610 and 620, the interrogation device 500 queries the database 520 for the tag's EPC, to find out which features and times are to be used as discriminants for the authentic RFID tag encoded with that EPC. The interrogation device then fingerprints the EPCs by performing the dynamic wavelet fingerprinting (DWFP) technique at steps 630-636 of FIG. 6 and optionally, extracting statistical features 640 and other features 650. A processor in the interrogation device then compares the measured values of the selected features of the RFID tag signal with the stored feature values in the database for that EPC, and classifies the RFIG tag as either authentic or non-authentic, as shown at step 660 of FIG. 6.

The database can be stored in computer memory of the interrogation device, or remotely at another location. If the database is stored remotely, the interrogation device will include a communications device for querying the remote database for information about a particular EPC and for receiving the requested information. Alternatively, the RFID tag itself can be encoded with the list of features and the feature values that are to be used to authenticate the particular RFID tag and EPC. In an exemplary embodiment, the processor for the classifier that compares the features of the RFID signal to the stored features for a particular EPC is included in the interrogation device. Alternatively, the interrogation device can transmit the RFID signal via a communication link to another device, which can then classify the RFID tag encoded with the EPC as authentic or not authentic and send the response to the interrogator.

Design of Classifier

The classification system is designed to discriminate between different individual tags, whether the tags are the same or different models, from the same or different manufacturers, or are drawn from the same or different frequency ranges.

The classifiers, which are trained on a training set, can be linear discriminant classifiers (LDC), quadratic discriminant classifiers (QDC), k-nearest-neighbor (kNN), or Support Vector Machines (SVM). A consideration for the classification process is how to separate the N×M features into training and testing subsets, with M being the selected number of features used to classify a tag and N being the number of tags.

A holdout algorithm can separate the N×M features $x_{j,k}$ into training and testing subsets. Details of a suitable holdout algorithm are found in L. N. Kucheva, Combining pattern classifier methods, New York: Wiley, 2004. The holdout algorithm splits the set of tags $X=x_{j,k}$ into training sets $(X_R)$ and testing sets $(X_T)$, usually with the training set being about half the size of the set of tags X. The classifier is trained on the training set $X_R$ and tested on the testing set $X_T=X-X_R$.

There are several different variables to configure for classifier design. Each combination of these variables leads to a different classifier and a different result. The variables are:

(1) EPC compression method: amplitude, phase, or instantaneous frequency or feature vectors combining both amplitude and phase or amplitude and instantaneous frequency (2) Classifier map: QDC and LDC from MATLAB or PRTools, kNN using k=1, 2, 3, and SVM.

(3) The number of DWFP features M. As described above, the features are selected by maximizing the distance measure, but the number of features selected is left free. For example, the system can be configured to give the user an option in which the number of features can be any one of {1, 5, 10, 15, 20, 50, 75, 100}.

(4) Different values of $\eta$, where $\eta$ represents the fraction of EPCs from the testing tag that were withheld for the testing set T, with rest inserted into the training set R, so that $\eta$ is greater than zero and less than or equal to one.

(5) Different values of $\rho$. The variable $\rho$ is greater than zero, and represents the fraction of negative versus positive EPCs in the training set R. The option in which all the EPCs not already reserved for testing set were used for training was also tested ($\rho$=all).

These variables were tested to evaluate their effect on classifier performance, with a goal of finding the best classifier. As variables are changed, the classifiers are trained on the training set and tested on the testing sets. Several different types of tags were used to train and test a classifier based on the RFID signal features discussed above. Each tag was configured to fit standards for EPC Class 1 Gen 2, as described in EPC Global Inc., "EPC Radio-Frequency Identity Protocols: Class-1 Generation 2 UHF RFID Protocol for Communications at 860 MHz-960 MHz", Version 1.2.0, October 2008.

In a demonstration, the binary classifier could identify whether or not RFID tag A is the same as RFID tag B with better than 99% accuracy, despite the fact that tag A and tag B present the same EPC information. This classifier does not determine the identification of tag A, only whether or not it is the same as tag B. This characteristic makes the system more suitable for some applications, such as ID badges, than other applications.

The RFID authentication system described herein is believed to provide better performance than the current RFID security systems that rely more on cryptography than on pattern classification. This system relies only on unintended qualities of the EPCs themselves, rather than relying on demodulation of the RFID ASK encoding modulation.

Additional testing and design can be conducted on many more tags from different manufactures to apply the method presented here across tag types and manufacturers.

The invention described herein has several aspects. One aspect is the method for selecting features for individual RFID tags, with the features including dynamic wavelet fingerprint features, and for storing within a database a list of the selected features and the values of the selected features for each RFID tag. Another aspect is the method for interrogating an RFID tag, comparing the features of the signal to the stored features, and classifying the RFID tag as authentic or not authentic.

Note that in the examples described herein, an interrogator interrogates a passive RFID tag, however, the method and systems described herein can also be implemented for active RFID tags.

In addition, the term EPC is used herein to describe the signal encoded on a particular RFID tag, not limited to any particular signal standards.

In an exemplary embodiment, the system can operate without human control for selection of suitable features for a particular RFID tag. The system can also operate without human control for receiving an RFID signal, determining the feature values for the signal, and comparing those features with the stored features to determine authenticity of the RFID tag. Alternatively, the system can receive instructions via a user interface.

Note, it is also envisioned that all the available DWFP features could be used to classify each of the RFID tags as authentic or not authentic, without reducing the number of features via the feature selection process at step 238 of FIG. 2.

Many of the steps of the methods described herein can be implemented in software with an interface to receive the RFID signals.

The computer-based system can also include storage capabilities. All the acquired data, including can be stored locally in addition to being transmitted over a communications link.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include MATLAB, FORTRAN, C, C++, Java, Python and Perl. MATLAB or another computational language is particularly suited for the feature selection steps.

By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices.

Although this invention has been described in relation to several exemplary embodiments thereof, it is well understood by those skilled in the art that other variations and modifications can be affected on the preferred embodiments without departing from scope and spirit of the invention as set forth in the claims.

What is claimed as new and desired to be protected by Letters Patent of the United States is:

1. A method for determining authenticity of a radio frequency identification tag encoded with an EPC, the method comprising:
    receiving a signal from the radio frequency identification tag;
    extracting features from the signal, wherein said extracting features includes
        applying a wavelet transform to the signal to determine wavelet coefficients at a plurality of times and frequency scale values,
        slicing the wavelet coefficients at different amplitudes and projecting the resulting slices onto a time-scale plane or a time-frequency plane to create binary images consisting of on and off pixels,
        segmenting each binary image into a plurality of regions for further analysis, each region having at least one concentric loop, and
        measuring image features of the regions in each binary image; and
    comparing the measured image features to a database of features for the signal's EPC to classify the RFID tag as being authentic or not authentic.

2. The method according to claim 1, wherein the measured image features include at least one of area, perimeter, coordinates of pixels, centroid, eccentricity of an ellipse corresponding to the second moment of a fingerprint object in the binary image, diameter of a circle with the same area as the fingerprint object, a Euler number of the fingerprint object, the extent of the fingerprint object, the filled area of the fingerprint object, solidarity, central area, normalized second central moment, inclination of a major axis of the ellipse relative to a horizontal axis, and a polynomial coefficients of a $2^{nd}$ or $4^{th}$ order polynomial fit to a boundary of the fingerprint object.

3. The method according to claim 1, further comprising:
    storing the RFID tag signal; and
    querying the database to determine which features to extract from the signal.

4. The method according to claim 1, further comprising:
    low pass filtering the signal before said applying the wavelet transform.

5. The method according to claim 3, wherein said low pass filtering includes applying a stationary wavelet transform to the signal and removing at least a first detail.

6. The method according to claim 3, wherein said low pass filtering includes applying a stationary wavelet transform to the signal and removing the first five details.

7. The method according to claim 1, wherein said extracting features includes determining statistical features for the signal, the statistical features including at least one of the mean of the EPC, the maximum correlation of the signal with another EPC from the same tag, the variance of the signal, the Shannon entropy, the second central moment, skewness, and kurtosis.

8. A method for measuring and storing dynamic wavelet fingerprint features of an RFID tag for authenticating the RFID tag, the method comprising:
    receiving a signal from a radio frequency identification tag encoded with an identifying code;
    extracting features from the signal, wherein said extracting features includes
        applying a wavelet transform to the signal to determine wavelet coefficients at a plurality of times and frequency scale values, a binary image from the slicing the wavelet coefficients at different amplitudes and projecting the resulting slices onto a time-scale plane or a time-frequency plane to create binary images consisting of on and off pixels, segmenting each binary image into a plurality of regions for further analysis, each region having at least one concentric loop, and measuring a plurality of image features of the regions; and storing the RFID EPC and the measured plurality of image features in an authentication database of RFID tag information for use in authenticating the RFID tag.

9. The method according to claim 8, wherein the plurality of image features includes at least one of area, perimeter, coordinates of pixels, centroid, eccentricity of an ellipse corresponding to the second moment of a fingerprint object in the binary image, diameter of a circle with the same area as the fingerprint object, a Euler number of the fingerprint object, the extent of the fingerprint object, the filled area of the fingerprint object, solidarity, central area, normalized second central moment, inclination of a major axis of the ellipse relative to a horizontal axis, and a polynomial coefficients of a $2^{nd}$ or $4^{th}$ order polynomial fit to a boundary of the fingerprint object.

10. The method according to claim 8, further comprising:
determining statistical features for the signal, the statistical features including at least one of the mean of the EPC, the maximum correlation of the signal with another EPC from the same tag, the variance of the signal, the Shannon entropy, the second central moment, skewness, and kurtosis; and
storing the statistical features in the authentication database.

11. The method according to claim 8, further comprising: selecting a smaller number of the plurality of image features for use in authenticating the RFID tag.

12. The method according to claim 11, further comprising: storing the selected features in the authentication database.

13. The method according to claim 11, further comprising: storing the selected features in the authentication database, and not storing unselected features in the authentication database.

14. The method according to claim 11, wherein said selecting includes linearly interpolating the image feature values over time, normalizing the linearly interpolated image feature values, and using a Euclidean distance metric for the linearly interpolated image feature values to identify features with a highly separable interclass distance as the selected features.

15. A radio frequency identification tag reader for authenticating a radio frequency identification tag, the radio frequency identification tag reader having a processor programmed with instructions, said instructions configured for:
receiving a signal from the radio frequency identification tag;
extracting features from the signal, wherein said extracting features includes
applying a wavelet transform to the signal to determine wavelet coefficients at a plurality of times and frequency scale values,
slicing the wavelet coefficients at different amplitudes and projecting the resulting slices onto a time-scale plane or a time-frequency plane to create binary images consisting of on and off pixels,
segmenting each binary image into a plurality of regions for further analysis, each region having at least one concentric loop, and
measuring image features of the regions in the binary image; and
comparing the measured image features to an authentication database of features specific to the RFID EPC to classify the RFID tag as being authentic or not authentic.

16. The radio frequency identification tag reader of claim 15, wherein the measured image features include at least one of area, perimeter, coordinates of pixels, centroid, eccentricity of an ellipse corresponding to the second moment of a fingerprint object in the binary image, diameter of a circle with the same area as the fingerprint object, a Euler number of the fingerprint object, the extent of the fingerprint object, the filled area of the fingerprint object, solidarity, central area, normalized second central moment, inclination of a major axis of the ellipse relative to a horizontal axis, and a polynomial coefficients of a $2^{nd}$ or $4^{th}$ order polynomial fit to a boundary of the fingerprint object.

* * * * *